(12) United States Patent
Jackson, III

(10) Patent No.: US 9,241,481 B1
(45) Date of Patent: Jan. 26, 2016

(54) FISHING LURE

(71) Applicant: Robert A. Jackson, III, Nashville, TN (US)

(72) Inventor: Robert A. Jackson, III, Nashville, TN (US)

( * ) Notice: Subject to any disclaimer, the term of this patent is extended or adjusted under 35 U.S.C. 154(b) by 281 days.

(21) Appl. No.: 14/064,512

(22) Filed: Oct. 28, 2013

(51) Int. Cl.
*A01K 85/00* (2006.01)
*A01K 85/12* (2006.01)

(52) U.S. Cl.
CPC ........................................ *A01K 85/12* (2013.01)

(58) Field of Classification Search
USPC ............................. 43/42.19, 42.53, 42.36, 42
See application file for complete search history.

(56) References Cited

U.S. PATENT DOCUMENTS

| | | | | |
|---|---|---|---|---|
| 973,246 A * | 10/1910 | Aagaard | ................ | A01K 83/06 43/42.19 |
| 1,513,011 A * | 10/1924 | Russell | ................... | A01K 83/00 43/42.19 |
| 1,533,022 A * | 4/1925 | Thaddeus | ............... | A01K 85/10 43/42.19 |
| 1,698,193 A * | 1/1929 | Geer | ...................... | A01K 85/10 24/598.1 |
| 2,486,635 A * | 11/1949 | Coats | ..................... | A01K 85/10 24/601.3 |
| 2,940,204 A * | 6/1960 | Mehnert | ................ | A01K 85/10 43/42.08 |
| 3,555,717 A * | 1/1971 | Gautsche | ............... | A01K 85/10 43/17.5 |
| 4,121,366 A * | 10/1978 | McClellan | ............ | A01K 85/10 43/42.09 |
| 4,530,180 A * | 7/1985 | Gwaldacz, Sr. | ........ | A01K 85/00 43/42.28 |
| 4,536,986 A * | 8/1985 | Stout | ...................... | A01K 85/00 43/42.11 |
| 4,551,940 A * | 11/1985 | East | ....................... | A01K 85/00 43/42.11 |
| 5,226,253 A * | 7/1993 | Daniel | .................... | A01K 85/00 43/42.13 |
| 8,151,513 B2 * | 4/2012 | Grimaldi | ................ | A01K 85/00 43/42.17 |

* cited by examiner

*Primary Examiner* — Christopher P Ellis
(74) *Attorney, Agent, or Firm* — Luedeka Neely Group, PC

(57) ABSTRACT

A fishing lure including a one-piece length of wire configured to have an uppermost loop for attachment of a fishing line, a first linear segment, a first bend, a second linear segment extending from the first bend and towards the uppermost loop so as to be closely adjacent and parallel to a lower portion of the first linear segment, the second linear segment terminating at a second bend, and a third linear segment extending from the second bend to a terminal loop, the second bend configured to orient the third linear segment in a direction extending generally away from the first linear segment and the second linear segment. A hook is positioned on the first bend and a spinner is operatively associated with terminal loop for rotating relative to the terminal loop.

5 Claims, 8 Drawing Sheets

FISHING LURE

FIELD

This disclosure relates to the field of fishing lures. More particularly, this disclosure relates to a fishing lure having an inline and an off-set spinner.

BACKGROUND AND SUMMARY

Improvement is desired in the manufacture of fishing lures.

The disclosure advantageously provides a new configuration for a fishing lure, with the lure configured to be able to utilize both an in-line and an offset spinner, and being made from a single length of wire.

In one embodiment, the fishing lure includes a one-piece length of wire configured to have an uppermost loop for attachment of a fishing line, a first linear segment, a first bend, a second linear segment extending from the first bend and towards the uppermost loop so as to be closely adjacent and parallel to a lower portion of the first linear segment, the second linear segment terminating at a second bend, and a third linear segment extending from the second bend to a terminal loop. The second bend is configured to orient the third linear segment in a direction extending generally away from the first linear segment and the second linear segment. A hook is positioned on the first bend, and spinner is operatively associated with terminal loop for rotating relative to the terminal loop to provide an offset spinner. In other configurations, an additional spinner is located between the uppermost loop and the second bend and configured to rotate about the first linear segment.

BRIEF DESCRIPTION OF THE DRAWINGS

Further advantages of the disclosure are apparent by reference to the detailed description when considered in conjunction with the figures, which are not to scale so as to more clearly show the details, wherein like reference numbers indicate like elements throughout the several views, and wherein.

DETAILED DESCRIPTION

Figure 1:
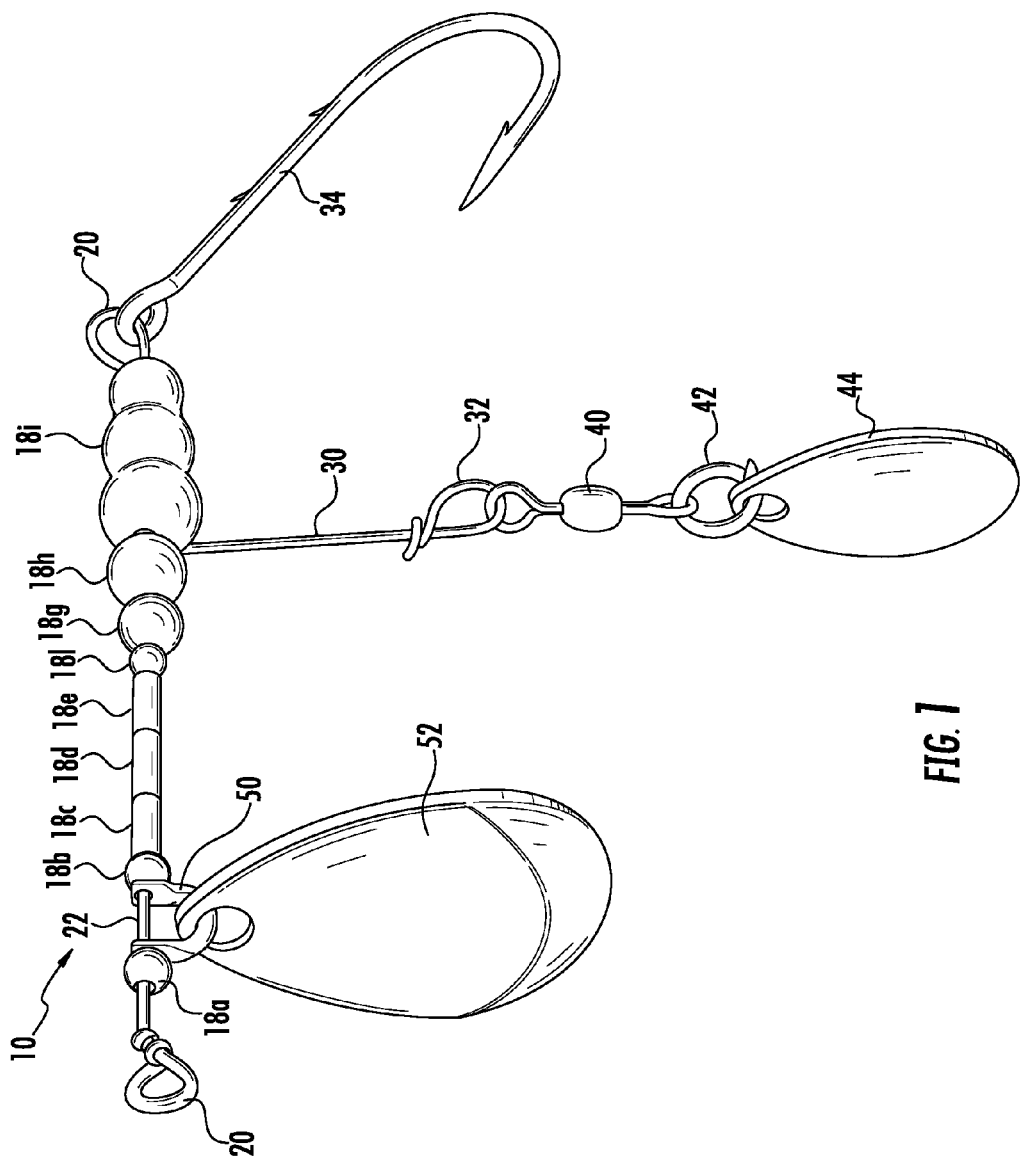
FIG. 1 is a perspective view of a fishing lure according to the disclosure.
Figure 2:
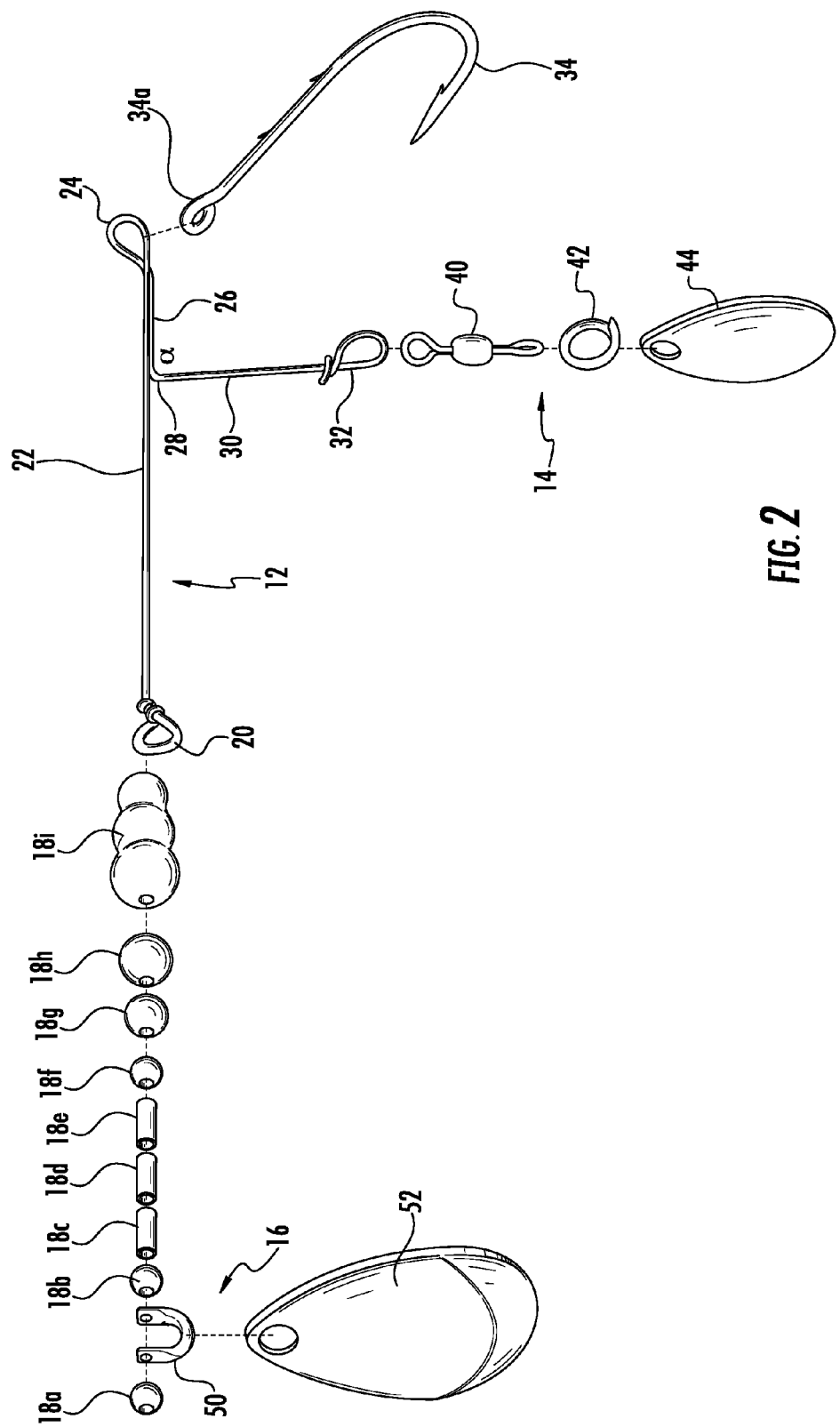
FIG. 2 is an exploded view of the lure of FIG. 1.
Figure 3:
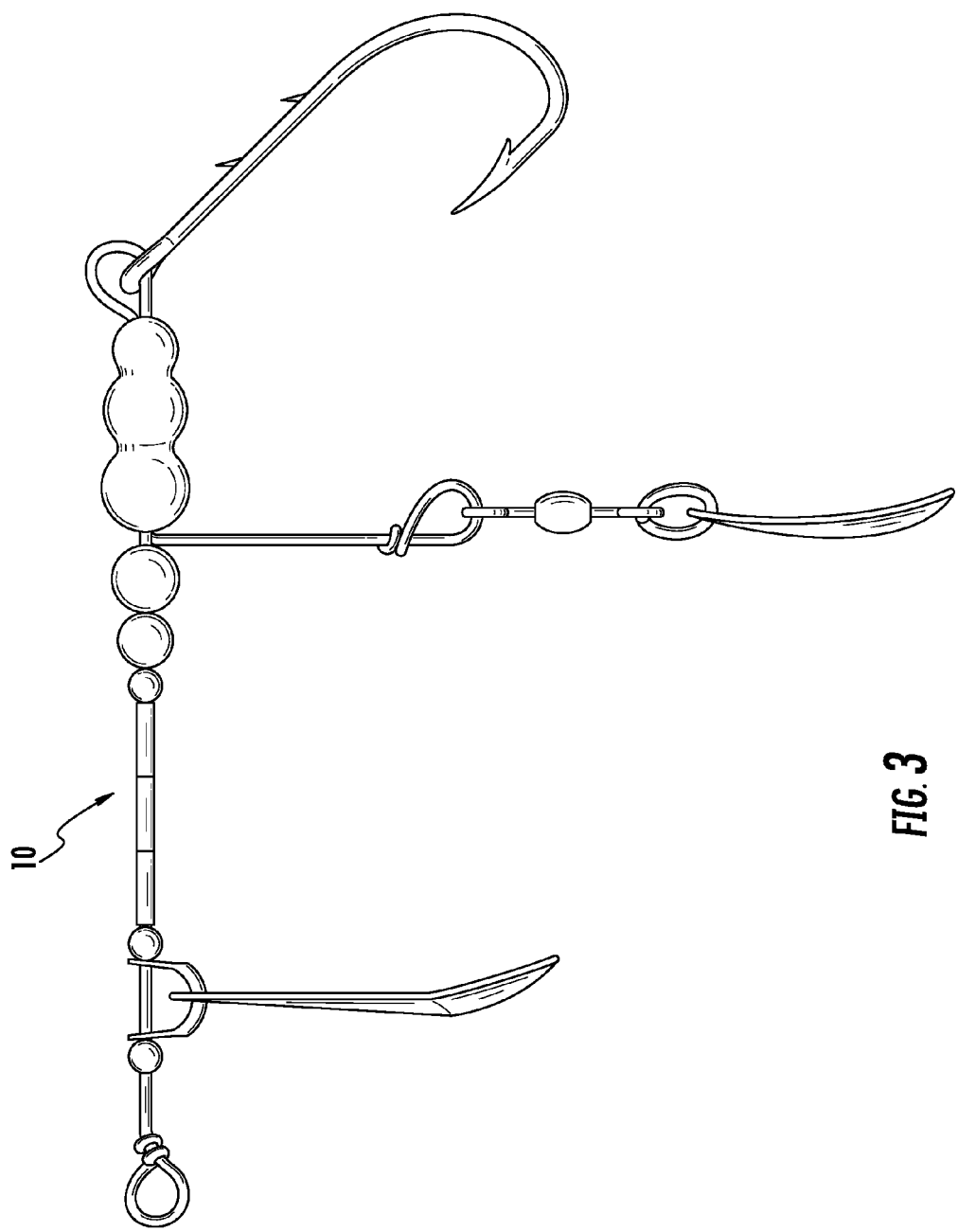
FIG. 3 is a front plan view of the lure of FIG. 1.
Figure 4:
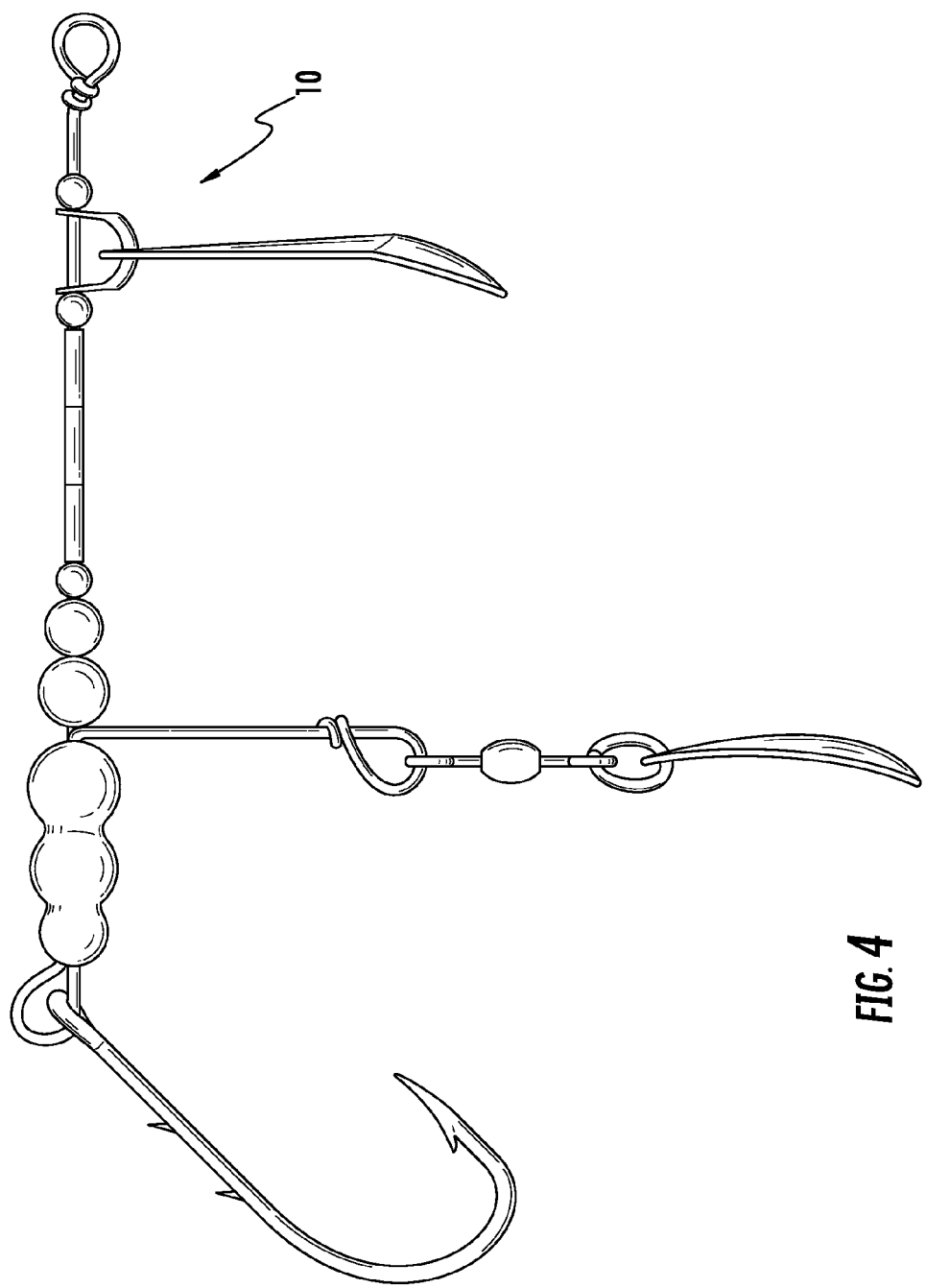
FIG. 4 is a rear plan view of the lure of FIG. 1.

With initial reference to FIGS. 1-4, the disclosure relates to a fishing lure 10 having a one-piece elongate wire member 12 and at least one spinner assembly 14 mounted thereto. In a preferred embodiment, the lure also includes an additional spinner assembly 16, and a plurality of body members 18a-18i disposed on the wire member 12.

The wire member 12 is a one-piece length of wire configured to have an uppermost loop 20, a first linear segment 22, a lower bend 24, a second linear segment 26 extending from the lower bend 24 and towards the uppermost loop 20 so as to be closely adjacent and parallel to a lower portion of the first linear segment 22. The second linear segment 26 terminates at a bend 28, and a third linear segment 30 extends from the bend 28 to a terminal loop 32. The bend 28 preferably ranges to provide an angle a of from about 80 degrees to about 110 degrees, most preferably about 90 degrees, so that the third linear segment 30 is oriented to be substantially perpendicular to both the first linear segment 22 and the second linear segment 26.

The length of the first linear segment 22 is preferably at least about twice the length of the second linear segment 26, with a preferred ratio of the length of first linear segment 22 to the length of the second linear segment 26 being from about 2 to about 4. The length of the third linear segment 30 is preferably substantially the same as the length of the second linear segment 26, such that the ratio of the length of the third linear segment 30 to the length of the second linear segment 26 is preferably in a range of from about 0.75 to about 1.25. For use as a bass lure, the first linear segment 22 preferably has a length of about 2.75 inches, and the second linear segment 26 and the third linear segment 30 is each about 0.75 inches.

The uppermost loop 20 of the wire member 12 is configured for attachment of a fishing line, as by tying a knot in the fishing line to secure it to the loop 22. The lower bend 24 is configured for receiving and locating a fishing hook 34 at the lowermost portion of the lure 10, with an eye 34a of the hook 34 receiving the bend 24. The fishing hook 34 may be a single, double, treble, or other type of fishing hook.

The spinner assembly 14 may be provided as by a variety of conventional spinner blades and associated hardware, and, for the purpose of example, may include a swivel 40 having one end connected to the loop 32 at the end of the third linear segment 30, a split ring 42 connected to the opposite end of the swivel 40, and a spinner blade 44 connected to the split ring 42. When the lure 10 is retrieved, the spinner blade 44 will rotate relative to the loop 32 of the third linear segment 30.

The spinner assembly 16 is configured as an in-line spinner, and is provided as by a clevis 50 rotatably mounted onto the wire member 12 proximate and below the uppermost loop 22 of the wire member 12, and preferably between the body members 18a and 18b. A spinner blade 52 is mounted onto the clevis 50. When the lure 10 is retrieved, the spinner blade 52 will rotate about the first linear segment 20 of the wire member 12.

The body members 18a-18i may be provided as by plastic and/or metal beads and/or sleeves and/or other shaped members, each of the body members having a central aperture therethrough for passage of the wire member 12. The body members 18a-18h are located on the first linear segment 22, and the body member 18i is preferably located so as to receive both the first linear segment 22 and the second linear segment 26. This may be accomplished as by positioning the body member 18i after the bend 24 is formed, but before the bend 28 is formed.

Figure 5:
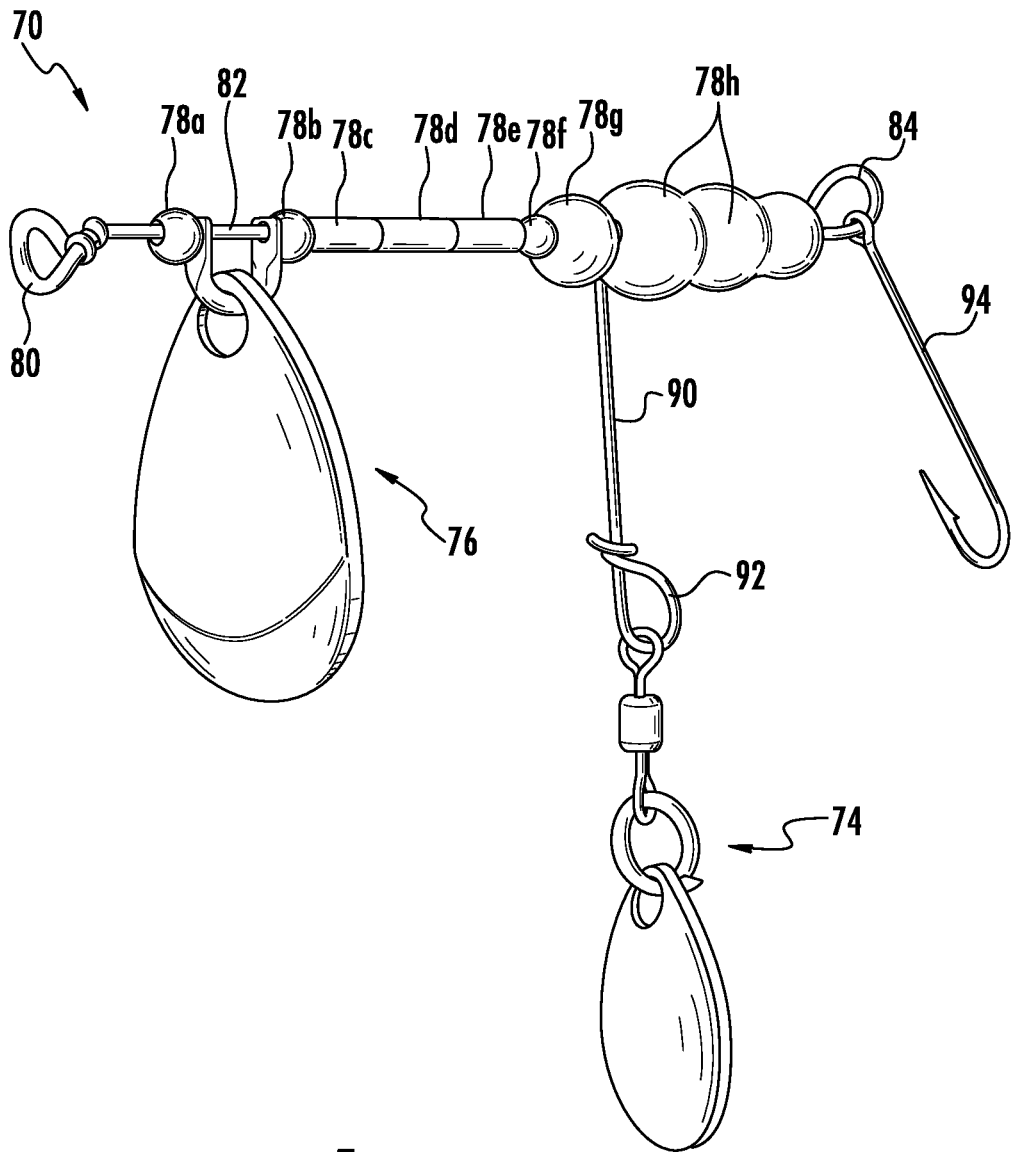
FIG. 5 is a perspective view of an alternate embodiment of a fishing lure according to the disclosure.
Figure 6:
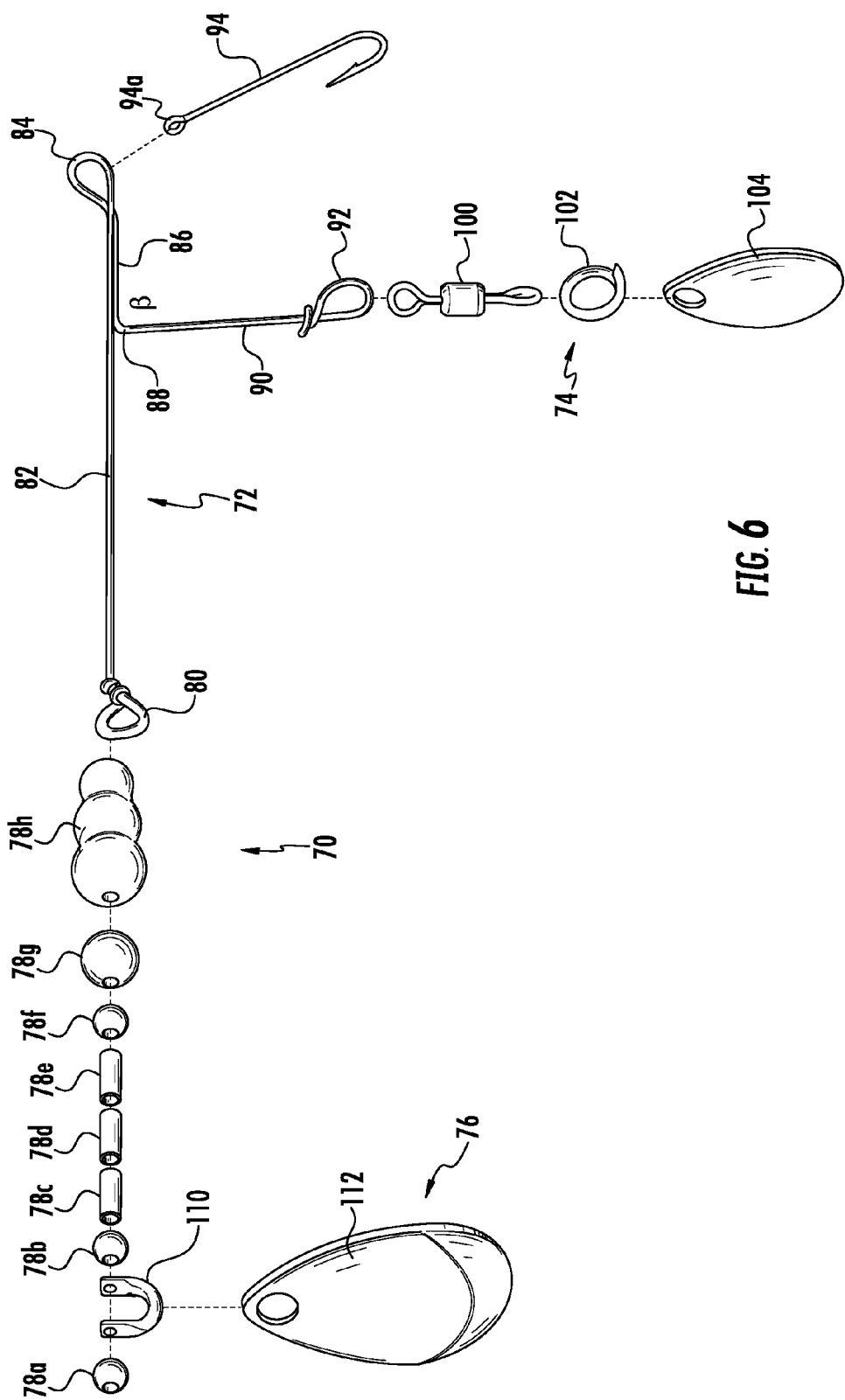
FIG. 6 is an exploded view of the lure of FIG. 4.
Figure 7:
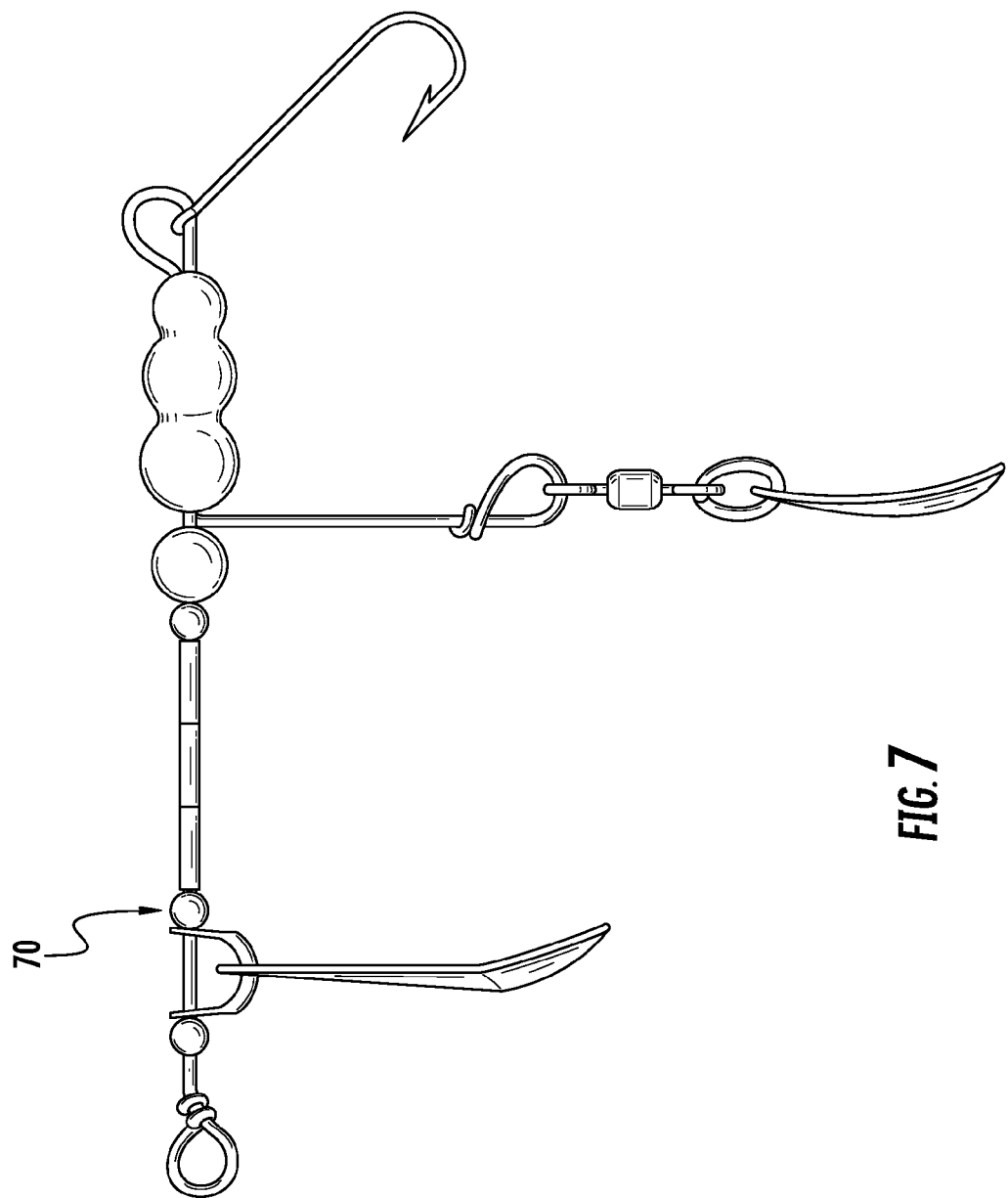
FIG. 7 is a front plan view of the lure of FIG. 4.
Figure 8:
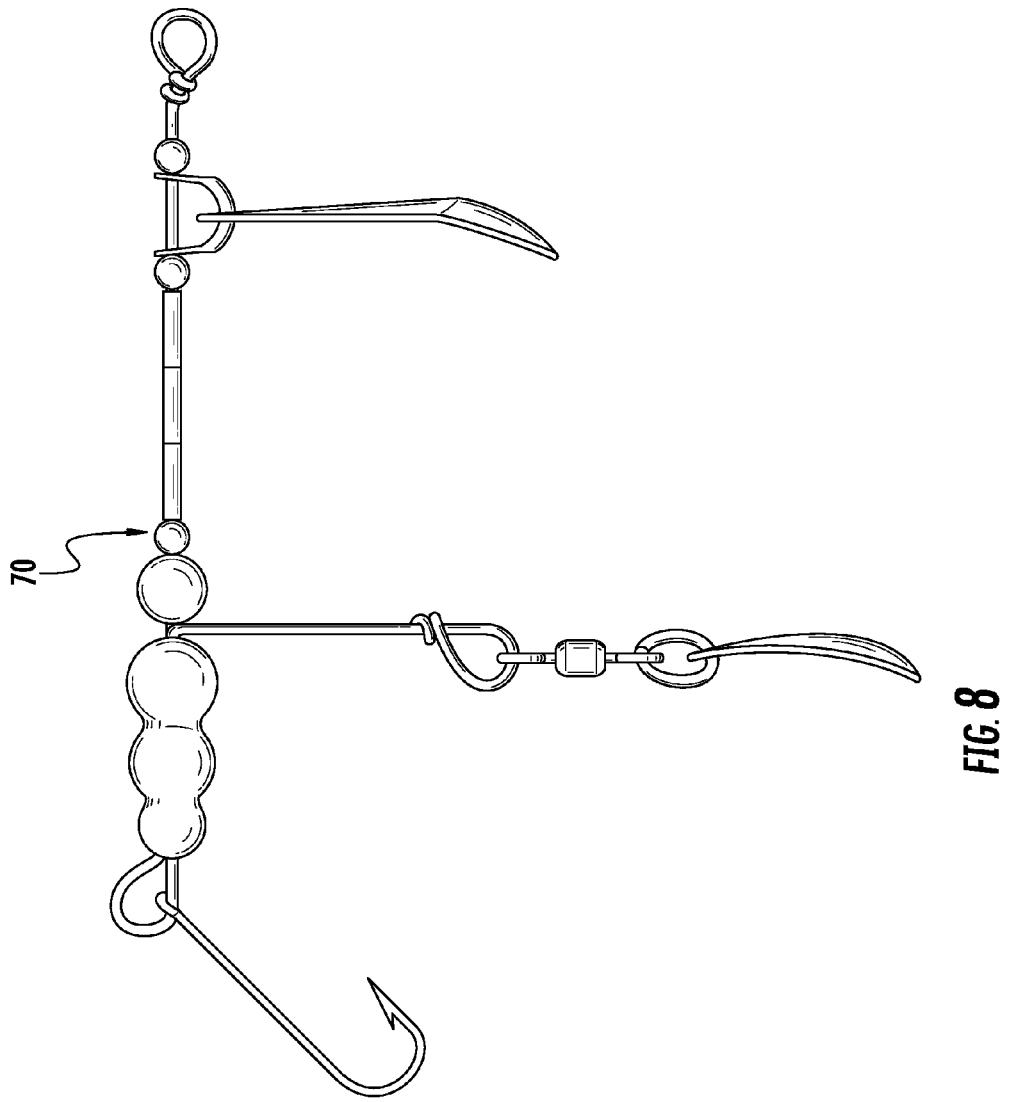
FIG. 8 is a rear plan view of the lure of FIG. 4.

With reference to FIGS. 5-8, there is shown an alternate embodiment of a lure 70. The lure 70 is substantially identical to the lure 10, except it is of smaller dimension, and is desirably sized for use to catch trout, panfish, and the like.

The lure 70 includes a one-piece elongate wire member 72 and at least one spinner assembly 74 mounted thereto. In a preferred embodiment, the lure also includes an additional spinner assembly 76, and a plurality of body members 78a-78h disposed on the wire member 12.

The wire member 72 is a one-piece length of wire configured to have un uppermost loop 80, a first linear segment 82, a lower bend 84, a second linear segment 86 extending from the lower bend 84 and towards the uppermost loop 80 so as to be closely adjacent and parallel to a lower portion of the first linear segment 82. The second linear segment 86 terminates at a bend 88, and a third linear segment 90 extends from the bend 88 to a terminal loop 92. The bend 88 preferably ranges to provide an angle β of from about 80 degrees to about 110 degrees, most preferably about 90 degrees, so that the third linear segment 90 is oriented to be substantially perpendicular to both the first linear segment 82 and the second linear segment 86.

The length of the first linear segment 82 is preferably at least about twice the length of the second linear segment 86, with a preferred ratio of the length of first linear segment 82 to the length of the second linear segment 86 being from about 2 to about 4. The length of the third linear segment 90 is preferably substantially the same as the length of the second linear segment 96, such that the ratio of the length of the third linear segment 90 to the length of the second linear segment 96 is preferably in a range of from about 0.75 to about 1.25. For use as a trout lure, the first linear segment 92 preferably has a length of about 2.25 inches, and the second linear segment 96 and the third linear segment 90 is each about 0.75 inches.

The uppermost loop 80 of the wire member 72 is configured for attachment of a fishing line, as by tying a knot in the fishing line to secure it to the loop 80. The lower bend 84 is configured for receiving and locating a fishing hook 94 at the lowermost portion of the lure 70, with an eye 94a of the hook 34 receiving the bend 84. The fishing hook 94 may be a single, double, treble, or other type of fishing hook.

The spinner assembly 74 may be provided as by a variety of conventional spinner blades and associated hardware, and, for the purpose of example, may include a swivel 100 having one end connected to the loop 92 at the end of the third linear segment 90, a split ring 102 connected to the opposite end of the swivel 100, and a spinner blade 104 connected to the split ring 102. When the lure 70 is retrieved, the spinner blade 104 will rotate relative to the loop 92 of the third linear segment 90.

The spinner assembly 76 is configured as an in-line spinner, and is provided as by a clevis 110 rotatably mounted onto the wire member 72 proximate and below the uppermost loop 80 of the wire member 72, and preferably between the body members 78a and 78b. A spinner blade 112 is mounted onto the clevis 110. When the lure 70 is retrieved, the spinner blade 112 will rotate about the first linear segment 82 of the wire member 72.

The body members 78a-78h may be provided as by plastic and/or metal beads and/or sleeves and/or other shaped members, each of the body members having a central aperture therethrough for passage of the wire member 72. The body members 78a-78g are located on the first linear segment 82, and the body member 78h is preferably located so as to receive both the first linear segment 82 and the second linear segment 86.

Accordingly, the disclosure advantageously provides a new configuration for a fishing lure, with the lure configured to be able to utilize both an in-line and an offset spinner, and being made from a single length of wire The foregoing description of preferred embodiments for this disclosure has been presented for purposes of illustration and description. It is not intended to be exhaustive or to limit the disclosure to the precise form disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the disclosure in various embodiments and with various modifications as are suited to the particular use contemplated. All such modifications and variations are within the scope of the disclosure as determined by the appended claims when interpreted in accordance with the breadth to which they are fairly, legally, and equitably entitled.

The invention claimed is:

1. A fishing lure, comprising:
a one-piece length of wire configured to have an uppermost loop for attachment of a fishing line, a first linear segment, a first bend, a second linear segment extending from the first bend and towards the uppermost loop so as to be closely adjacent and parallel to a lower portion of the first linear segment, the second linear segment terminating at a second bend, and a third linear segment extending from the second bend to a terminal loop, the second bend configured to orient the third linear segment in a direction extending generally away from the first linear segment and the second linear segment;
a hook positioned on the first bend; and
a first spinner operatively associated with terminal loop for rotating relative to the terminal loop.

2. The fishing lure of claim 1, wherein the second bend is configured to position the third linear segment at an angle of from about 80 degrees to about 110 degrees relative to both the first linear segment and the second linear segment.

3. The fishing lure of claim 1, further comprising a second spinner located between the uppermost loop and the second bend and configured to rotate about the first linear segment.

4. The fishing lure of claim 1, further comprising one or more body members located on the first linear segment or the second linear segment or both.

5. The fishing lure of claim 1, wherein the ratio of the length of first linear segment to the length of the second linear segment ranges from about 2 to about 4, and the ratio of the length of the third linear segment to the length of the second linear segment ranges from about 0.75 to about 1.25.

* * * * *